United States Patent [19] [11] 4,111,858
Kostrzewa et al. [45] Sep. 5, 1978

[54] PROCESS FOR THE PREPARATION OF POLYHYDROXY METHYLENE ETHERS AND ION EXCHANGERS COMPOSED THEREOF

[75] Inventors: Michael Kostrzewa; Karl-Friedrich Mück, both of Wiesbaden, Fed. Rep. of Germany

[73] Assignee: Hoechst Aktiengesellschaft, Fed. Rep. of Germany

[21] Appl. No.: 788,848

[22] Filed: Apr. 19, 1977

Related U.S. Application Data

[63] Continuation-in-part of Ser. No. 721,986, Sep. 10, 1976, abandoned.

[30] Foreign Application Priority Data

Sep. 12, 1975 [DE] Fed. Rep. of Germany ....... 2540688

[51] Int. Cl.$^2$ .......................... C08F 16/12; C08F 8/40; C08F 8/30
[52] U.S. Cl. .......................................... 521/25; 521/30
[58] Field of Search .......................... 260/2.1 R, 2.2 R; 526/9

[56] References Cited

U.S. PATENT DOCUMENTS

| 2,847,402 | 10/1958 | Gluesenkamp | 260/77.5 UA |
| 2,972,606 | 2/1961 | Hartman | 526/9 |
| 3,069,391 | 12/1962 | Schaefgen | 260/77.5 UA |
| 3,226,380 | 12/1965 | Knight | 526/9 |
| 3,432,512 | 3/1969 | Halpern | 526/9 |
| 3,741,945 | 6/1973 | Bourat | 260/2.2 R |
| 3,761,406 | 9/1973 | Taub et al. | 526/9 |
| 3,770,666 | 11/1973 | Quenten | 260/2.2 R |

FOREIGN PATENT DOCUMENTS 192,404 6/1967 U.S.S.R. ....................................... 526/9

Primary Examiner—Joseph L. Schofer
Assistant Examiner—Peter F. Kulkosky
Attorney, Agent, or Firm—James E. Bryan

[57] ABSTRACT

This invention relates to an improvement in the process for the preparation of a polyhydroxy methylene ether in which polyhydroxy methylene is reacted with an alkylating agent in an aqueous alkaline medium, the improvement comprising that the alkylating agent has at least one ionic or ionizable carboxyl group, phospho group, quaternary ammonium group, or substituted amino group. The invention also relates to ion exchangers composed of the polyhydroxy methylene ethers.

1 Claim, No Drawings

PROCESS FOR THE PREPARATION OF POLYHYDROXY METHYLENE ETHERS AND ION EXCHANGERS COMPOSED THEREOF

This application is a continuation-in-part of application Ser. No. 721,986, filed Sept. 10, 1976 now abandoned.

The present invention relates to a process for the preparation of polyhydroxy methylene ethers and to ion exchangers composed of the polyhydroxy methylene ethers prepared in accordance with the process.

Instead of starch and gelatin, cellulose derivatives, for example, have been used for a long time as adhesives and binders or as emulsifiers in the chemical industry. There has been an increasing demand in recent years for special ion exchangers, in addition to adsorbing materials of the general type, especially in the biochemical industry, for use in chromatographic separating processes, e.g. in order to separate amino acid fractions or protein fractions from mixtures to be treated.

It is known to use cellulose ethers for this purpose, for example. Generally, cellulose is etherified by reacting it in an alkaline medium in a non-homogeneous phase with an alkylating agent, for example with halogen fatty acids. If the cellulose ethers are to be used as ion exchangers, the etherification agents used for their preparation carry substituents with ionic groups. In these etherification processes, the primary hydroxyl groups of the anhydro glucose unit are primarily attacked, whereas the secondary hydroxyl groups are only secondarily attacked.

These cellulose ethers and the ion exchangers prepared therefrom have the drawback that they are not stable to chemical and enzymatic attack. This property limits their wider use by biochemists, physiologists, and physicians.

It is known from "Uber die Sulfoalkylierung von Polymethylol" (The Sulfo-alkylating of Polymethylol), by R. C. Schulz and N. Vollkommer in Die Makromolekulare Chemie, 113, 307-309 (1970), that polymethylol (PHM) can be reacted with propane-sultone and in that process polyvinylene carbonate is saponified with an excess of 2.5 N to 5 N aqueous NaOH solution and the PHM, without isolation, is reacted with the sultone.

It is the object of the present invention to provide a process for the preparation of polyhydroxy methylene ethers and ion exchangers composed thereof, which can be used for different alkylating agents.

Thus, one object of the present invention is an improvement in the process for the preparation of a polyhydroxy methylene ether, in which polyhydroxy methylene is reacted with an alkylating agent in an aqueous-alkaline medium to which an organic solvent may be added, if desired; the improvement comprising that the alkylating agent has at least one ionic or ionizable carboxyl group, phospho group, quaternary ammonium group or substituted amino group.

A further object of the present invention is an ion exchanger composed of etherified polyhydroxy methylene, in which the alkoxy groups carry at least one ionic or ionizable carboxyl group, phospho group, quaternary ammonium group or substituted amino group. The polyhydroxy methylene used as the starting material in the process of the present invention is a known polymer the preparation of which is described, for example, by H. C. Haas and N. W. Schuler in "J. Polym. Science", Vol. 31, page 238 (1958).

Surprisingly, it was found that, although polyhydroxy methylene exclusively possesses secondary hydroxyl groups, it may be substituted to form ethers by reacting it with different alkylating agents. According to the process of the present invention, the reaction preferably is carried out according to one of the following two methods:

1. The components, i.e. polyhydroxy methylene, isopropanol, and NaOH solution, are mixed in a kneader, and an alkylating agent is added and reacted at a temperature between about 50° and 90° C, preferably at about 70° C.

2. Polyhydroxy methylene is dissolved at room temperature in an about 20 to 50 per cent by weight NaOH solution and the alkylating agent is added and reacted at a temperature between 20° and 90° C, preferably between about 70° and 90° C.

These reactions may be conducted in an aqueous-alkaline medium in a heterogeneous phase, an organic solvent, such as isopropanol, being added as a diluent, if desired; alternatively, the reactions may be conducted in a homogeneous phase, which is an essential improvement in the art, as compared, for example, with the conditions under which cellulose ethers are prepared, because it enables a more uniform substitution. Polyhydroxy methylene is insoluble in conventional solvents, such as water, alcohols, esters, acetone, dimethyl formamide, ethers, benzene, toluene, chloroform or dimethyl sulfoxide and swells only slightly in some of them; it is soluble, however, in alkaline solutions, for example in 25 to 50 per cent by weight solutions of NaOH at room temperature. If the temperature is raised as high as approximately 80° C, even a 20 per cent by weight NaOH solution will be sufficient.

If the solutions are diluted or the NaOH concentration is otherwise reduced, part of the polyhydroxy methylene may be reprecipitated during a progressive etherification process according to the second method. If the ether formed is soluble in water, however, the reaction may be continued in a homogeneous phase.

In addition to one or more groups capable of forming an ether, the alkylating agent to be used must have at least one functional ionic or ionizable group, for example a carboxyl group, a phospho group, a quaternary ammonium group, or a substituted amino group, in order to produce the desired ion exchanging property. Examples of substances which may be used for this purpose are:

N,N-dialkylamino-β-chloro-alkanes,
N,N-diarylamino-β-chloro-alkanes,
3-chloro-2-hydroxypropyl-trimethyl-ammonium-hydrochloride,
2,3-epoxypropyl-trimethyl-ammonium-hydrochloride,
ethylene imine,
chloro acetic acid,
dichloro acetic acid,
trichloro acetic acid,
chloroethane phosphonic acid,
vinyl phosphonic acid,
N,N-dichloro-ethyl-alkylamine, and
N,N-dichloro-ethyl-arylamine.

The products obtained according to the present invention may be water-soluble or preponderantly water-insoluble. These properties may be influenced by a suitable selection of the substituents, the degree of substitution, or by cross-linking with at least bi-functional reactants.

The process according to the present invention has the advantage that the substances produced possess an improved chemical stability and are not easily decomposed. In particular, they are resistant to enzymatic or other biochemical decomposing processes. If they possess ionic or ionizable groups, their ion exchanging capacity with ionic or crypto-ionic substances, for example under biochemical or physiological-chemical conditions, is excellent.

Thus, the polyhydroxy methylene ethers according to the present invention may be widely used, for example as ion exchangers in biochemistry, medicine, and physiological chemistry.

In the following examples, the percentages are by weight and the letters "MS" state the degree of molar substitution.

EXAMPLE 1

50 g of polyhydroxy methylene (1.67 moles, calculated on the polymer base unit) were mixed for 30 minutes in a kneader with 250 ml of 87 per cent isopropanol and 66.8 g of a 50 per cent by weight aqueous NaOH solution (0.84 mole) at a temperature of 25° C. Etherification was effected by dropwise adding 168 g of a 50 per cent by weight aqueous solution of 3-chloro-2-hydroxypropyl-trimethyl ammonium hydrochloride (0.45 mole), followed by one hour's heating to 70° C. The reaction mixture was then diluted with methanol and neutralized, with phenolphthalein serving as the indicator, by adding glacial acetic acid. The white powder obtained after filtration was washed with aqueous methanol and dried at 60° C. It contained 0.4 per cent by weight of nitrogen, which corresponds to an MS of about 0.01.

EXAMPLE 2

15 g of polyhydroxy methylene (0.5 mole) were added to 120 g of a 24 per cent aqueous NaOH solution (0.7 mole) in a three-necked flask of 500 ml capacity, heated to 70° C and stirred for 45 minutes at this temperature. Etherification was effected by dropwise adding 188 g of a 50 per cent by weight aqueous solution of 3-chloro-2-hydroxy-propyl-trimethyl-ammonium hydrochloride to the viscous, yellowish solution over a period of 10 minutes. The solution lost some of its viscosity and part of the substance precipitated. The reaction mixture was poured into 500 ml of water, filtered, washed with water, isopropyl alcohol and acetone, dried at 60° C, and finally ground. The resulting white powder contained 1.8 per cent by weight of N, which corresponds to an MS of 0.05.

EXAMPLE 3

10 g of polyhydroxy methylene (0.33 mole) were dissolved in 75 g of a 40 per cent aqueous NaOH solution (0.75 mole) and stirred for 45 minutes at 70° C. Etherification was effected by adding 65 g of glycidyl-trimethyl-ammonium chloride (0.43 mole), followed by heating and 45 minutes' stirring at 70° C. The reaction mixture was poured into 500 ml of water, filtered, washed neutral with water, dried at 60° C, and then ground. After dialysis in an aqueous suspension against water, followed by freeze-drying, a water-insoluble powder was obtained which contained 1.0 per cent by weight of N corresponding to an MS of 0.02.

EXAMPLE 4

The procedure described in Example 3 was repeated, except that 58 g of 2-chloroethyl-diethyl-amine (0.43 mole) were used as the etherification agent. The water-insoluble powder obtained contained 4.3 per cent by weight of N corresponding to a degree of substitution of 0.13.

EXAMPLE 5

15 g of polyhydroxy methylene (0.5 mole) were dissolved in a sodium hydroxide solution containing 44 g of NaOH (1.1 moles) in 200 g of water, and the viscous mass was then heated for 45 minutes to 80° to 90° C. Etherification was effected by dropwise adding 59 g of an 80 per cent by weight aqueous monochloro acetic acid solution (0.5 mole), followed by one hour's heating to 80° to 90° C. After cooling the mixture and neutralizing it with glacial acetic acid, using phenolphthalein as the indicator, the mass was diluted to 500 ml by adding water and poured into about 4 liters of methanol, whereupon the reaction product precipitated. After filtration, a white powder was obtained which was freed from chlorides by washing it three times with pure methanol. The mass was dried at 60° C and pulverized in a mortar. Yield: 17.6 g. The water-soluble substance contained 8.85 per cent by weight of Na, which corresponds to a degree of substitution of 0.175.

EXAMPLE 6

The procedure described in Example 3 was repeated, except that 84 g of dichloro-acetic acid (0.66 mole) were used as the etherification agent. The resulting water-insoluble powder contained 1.5 per cent by weight of Na.

EXAMPLE 7

The procedure described in Example 3 was repeated, except that 35 g of trichloro acetic acid (0.22 mole) were used as the etherification agent. A water-insoluble powder was obtained which contained 3.1 per cent by weight of Na.

It will be obvious to those skilled in the art that many modifications may be made within the scope of the present invention without departing from the spirit thereof, and the invention includes all such modifications.

What is claimed is:

1. An ion exchanger composed of etherified polyhydroxy methylene in which the alkoxy groups carry at least one ionic or ionizable carboxyl group, phospho group, quaternary ammonium group, or substituted amino group.

* * * * *